June 16, 1959  J. W. HOGAN  2,891,115
MAGNETIC TRANSDUCER
Filed Feb. 8, 1954
3 Sheets-Sheet 2

INVENTOR
John W. Hogan
BY
Merchant & Merchant
ATTORNEYS

June 16, 1959 J. W. HOGAN 2,891,115
MAGNETIC TRANSDUCER
Filed Feb. 8, 1954 3 Sheets-Sheet 3

INVENTOR.
John W. Hogan
BY
Merchant & Merchant
ATTORNEYS

United States Patent Office 2,891,115
Patented June 16, 1959

2,891,115

MAGNETIC TRANSDUCER

John W. Hogan, Minneapolis, Minn., assignor, by mesne assignments, to Gisholt Machine Company, Madison, Wis., a corporation of Wisconsin Application February 8, 1954, Serial No. 408,731

18 Claims. (Cl. 179—100.2)

Generally stated, it is an important objective of my present invention to provide improvements in magnetic-type transducers for use in the transduction of energy from one system to another via magnetic circuitry.

A further objective of the instant invention is the provision of improved means for generating electrical signal impulses.

Another important objective of the invention is the provision of improved means for generating electrical signal impulses by induction from a suitable source of magnetic energy or flux, such for example as a magnetized storage member, record, element or device.

The operation of the apparatus of the instant invention, as an electrical signal generator, may be explained as comprising the establishment of a flux circuit to an induction element or device from a suitable source of magnetic flux, such as a magnetized storage member, and the intermittent establishment of a second or shunt flux circuit including said source but independent of said induction element or device; the shunt circuit intermittently diverting flux from the flux circuit to the induction device or element so as to produce flux pulsations therein and corresponding electrical signal impulses in the induction device. This improved means or apparatus, represents a basic departure from all prior practice and teachings of which I am aware and results in the generation of an electrical signal of unusual great magnitude from a magnetic flux source of any given value. It is important to note that in accordance with this unique technique, none of the magnetic flux diverted from the flux circuit to the induction element is used for producing flux signal impulses in flux circuit to the induction device.

While the invention hereof has many potential uses, it was primarily conceived as an improvement in the art of reproducing, as an electrical signal, displacement intelligence magnetically impressed on suitable storage members or records, such as magnetized steel tapes, discs, drums, or other elements capable of retailing magnetic impressions, and the following description thereof will be limited to such uses or applications.

For use in practicing the invention in this art, I preferably provide improved apparatus in the nature of a magnetic pick-up comprising an induction device arranged to be in inductive relationship with a flux circuit between spaced points on one or more magnetic traces of a relatively movable storage member and a cooperating movable (preferably rotatable) sensing or detecting device having a shunt element or elements and arranged to intermittently and repeatedly shunt the flux circuit to the induction device by movement of a shunt element or elements thereof through the flux field between said spaced points on the trace or traces in a direction angular to (preferably transversely) the direction of relative movement between the storage member and the induction device. This intermittent shunting of the flux circuit to the induction device produces flux flow impulses in said flux circuit and corresponding electrical signal impuses in the induction device, the frequency of which signal impulses, is a function of the rate of relative angular movement or displacement between the trace and shunting element in directions transverse to the direction of movement of the storage member. In practice, the movable sensing or detecting device and its shunt element or elements will usually be moved (preferably rotated) at a fixed predetermined speed by a suitable synchronous motor or the like. Hence, for any given speed of relative movement between the storage member and the induction device and the sensing or detector in a predetermined direction, a signal of definite predetermined frequency will be produced from a trace or traces parallel to the direction of said relative movement of the storage member, and displacement or angulation of the trace or traces with respect to the direction of movement of the storage member will result in signal phase variations corresponding exactly to the magnitude of displacement of the trace or traces, per given time intervals, with respect to the direction or movement of the storage member.

From the above, it will be apparent that a particular object of the instant invention is the provision of improved means for translating the positions of a trace or traces relative to the direction of movement of a storage member upon which it or they are recorded into a continuously cycling varying signal whose displacement along a time axis is an exact index of the magnitude and direction of such trace or traces.

Another important objective of the invention is the provision of an improved means for translating the positions of a trace or traces relative to an edge of a storage member upon which it or they have been recorded into a continuously cyclically carrying signal whose displacement along a time axis is an exact index of the magnitude and direction of the displacement of such trace or traces.

This present disclosure uses certain techniques which, in a general way, are described, illustrated and claimed in United States Letters Patent No. 2,628,539, issued February 17, 1953 to Leif Eric de Neergaard.

The above-identified inventions along with the one herein disclosed, although having many other uses, are primarily intended to control the rate, direction and magnitude of displacement of work-to-tool or tool-to-work members of fabricating machines.

The magnetic pickup herein disclosed is particularly adapted to reproduce signals which have been impressed on a data storage member by means of so-called longitudinal recording. Those skilled in the art are aware that the magnitude of a signal which has been longitudinally recorded is many times greater than one which has been impressed by transverse recording through the body or cross section of a storage member. Since the pickups herein disclosed are capable of continuously picking up one or more longitudinally recorded traces, it is possible to produce a control signal of very great amplitude. This large signal output is of importance when it is used in servo-mechanisms automatically controlling machine tool cycles, it being realized that the magnitude of unwanted pulsating magnetic fields often found in fabricating shops is sufficient in many cases to completely overpower control signals of low amplitude.

One of the most important objects of the invention is to provide methods and means by whose use a magnetic sensing or detecting device can be made which has a "working" magnetic circuit and a co-acting "parasitic" magnetic circuit, the latter circuit being arranged to alternately divert or shunt magnetic flux from one group of separated points or areas and then to divert flux from a second group of magnetized points or areas. By use of this method, it is entirely feasible to continuously sense magnetic flux lying along parallel traces which by longitudinal recording have been impressed along the length of a storage member, such as a steel tape, and to convert the sensed flux into a sinusoidal electrical signal which has a very high signal-to-noise ratio.

Another object of the invention is the provision of a rotary pickup or scanner which cyclically shunts or bypasses magnetic flux of certain polarity which has been recorded in the form of one or more magnetized traces along the length of a storage member such as a steel tape.

Another object of my invention is to provide means by whose use one or more control signals can be continuously picked up from a control or storage member independent of the rate of movement of this member. Thus a reliable signal can be reproduced from the storage member if that element is being moved at a very low rate or even completely stopped.

Yet another salient feature of the invention is to provide a magnetic pickup which, although having but one single rotary sensing or detecting device is capable of picking up four, five or more separate control signals individually recorded along the length of a storage member, such as a magnetized tape.

Another object of the instant invention is to provide means by whose use a group of spaced parallel traces having a definite magnetic polarity pattern and a second group of oppositely magnetized traces lying in the areas separating the traces of the first group are successively scanned in a continuous manner by a series of spaced magnetic shunting elements.

Still another object of the invention is to provide a magnetic pickup adapted to instantaneously convert any displacement of one or more magnetized traces in directions transverse to the movement of the storage member upon which they are impressed into electrical phase displacements whose sign and magnitude are precise indices of the direction magnitude and rate of transverse displacement of the traces from instant to instant.

Another object is to provide a rotary signal sensing system whose pulsating E.M.F. signal output, after necessary filtering, takes the form of a substantially perfect sine-wave having an extremely low harmonic content.

A further object of my invention is to furnish a rotary sensing system in which an unavoidable eccentricity of a rotary shunting element relative to the face of a magnetized storage member, such as steel tape, produces an error whose magnitude is of a second order and relative unimportant.

Still another object of the invention is to supply a rotary signal sensing device incorporating but one moving part which in its preferred form takes the shape of a simple helical screw which can be accurately and economically made.

A further object of the invention is to provide a rotary signal sensing or detecting device having extremely small physical dimensions. Thus, as an example, a rotary pickup using methods and means herein disclosed capable of picking up six totally separated displacement signals can be housed in a case 1¼" x 2" x 2".

Another important objective of the invention is the provision of a magnetic pickup or signal generating device of the class described having an unusually high signal-to-noise ratio.

Still another important objective of the invention is the provision of a magnetic pickup or signal generating device, of the class described, of extremely simple construction, resulting in low initial cost and completely dependable operation with a minimum of maintenance.

A still further object of the invention is the provision of an improved magnetic pickup or signal generating device of the class described having an extremely simple magnetic circuit system.

Still another object of the invention is the provision of an improved magnetic pickup or signal generating device, of the class described, capable of operation within close proximity to and substantially unaffected by stray electrical fields of substantial magnitude.

A still further object of the invention is the provision of an improved apparatus or device of the class described which does not require degaussing, even when operated in close proximity to electrical fields of substantial magnitude.

The above and numerous other objects, features and advantages of the invention will be apparent from the following specification, claims, and appended drawings.

In the accompanying drawings, like characters indicate like parts throughout the several views.

Referring to the drawings.

While, as previously indicated, the invention may be practiced with magnetic records or storage members of various configurations, it has been found that the most universally desirable record configuration is represented by an elongated ribbon-like tape indicated by 1 in all of the figures hereof. As shown, this tape 1 is a flexible steel ribbon, but said tape may also take the form of conventional plastic-backed sound recording tape. This tape 1 has intelligence indicia magnetically recorded thereon. This indicia may be for various purposes but, for the purpose hereof, may be assumed to be for the purpose of controlling the operation of a machine tool or the like. As shown, this magnetically recorded indicia takes the form of one or more magnetic traces. Preferably, and as shown, the tape 1 has recorded thereon a plurality of alternately arranged parallel traces 2 and 3; the traces 2 being polarized in one direction and the traces 3 being polarized in the opposite direction. In the process of recording, this is generally accomplished by first magnetizing the entire tape to the polarity of one of the groups of traces 2 or 3 and then reversing the polarity of those areas representing the alternate group of traces 2 or 3. In fact, for the purpose hereof, the traces are preferably applied by the process of longitudinal recording, as distinguished from transverse recording, so that the traces 2 and 3 are polarized longitudinally thereof and parallel to the opposite wide faces or surfaces of the tape, with adjacent traces 2 and 3 polarized in opposite directions. Preferably, and as shown, the traces 2 and 3 are of equal widths and the spaces between adjacent traces 2 and between adjacent traces 3 correspond to the widths of the individual traces 2 and 3. For the purpose hereof, the spaces between adjacent traces 2 and the spaces between adjacent tracs 3 may be expressed as the pitch of such traces 2 or 3. For the purpose of the example given herein, it may be assumed that the pitch of the traces 2 and the pitch of the traces 3 is .050 inch, as measured transversely of the longitudinal axis of the tape 1. The traces 2 and 3 may be considered as ribbon-like magnets whose axes extend parallel to one another. Actually, each trace 2 and 3 consists of many infinitely small permanent magnets or series of permanent magnets which, during recording, are arranged with their axes in substantial parallelism with the edges of the control tape or record. In fact, the minute magnets in the traces 2 are arranged with their north poles oriented toward one end of the control tape and the north poles of the tiny magnets of the traces 3 oriented toward the opposite end of the control tape or record 1.

The media from which the storage member or record tape 1 is produced is of low permeability. Due to this fact, there is considerable flux leakage from the magnetized traces 2 and 3 where the long paths of leakage flux may be considered to be parallel to the many series of infinitely small magnets making up the traces 2 and 3. At the right-hand end of Fig. 6, an attempt has been made to illustrate the countless flux leakage loops appearing along the traces 2 and their directions by arcuate arrows X and Y; the arcuate arrows X indicating the flux leakage paths or loops above and through the tape and the arcuate arrows Y indicating the flux leakage loops or paths through and below the tape. It will, of course, be appreciated that a section similar to Fig. 6, but taken through a trace 3, would have similar flux leakage paths or loops going, however, in the opposite direction from that shown in Fig. 6. The leakage from the traces 2 and 3 constitutes the working flux for the magnetic pickups or signal generating apparatus hereinafter described.

As is well known to those skilled in the art, longitudinal magnetic recording of intelligence indicia or the like (where recording is done by polarization longitudinally of and parallel to a surface or surfaces of the record or storage member) is much more efficient than so-called transverse recording (where polarization is transversely of the opposed surfaces of the storage member and through the body thereof). Much sharper delineations of the signal can be obtained by longitudinal recording, and it is possible to impress signals on the record or storage member which are of very high magnitude as compared to signals impressed on a suitable record or storage member by transverse recording methods.

Figures 1, 2, 3, 4:
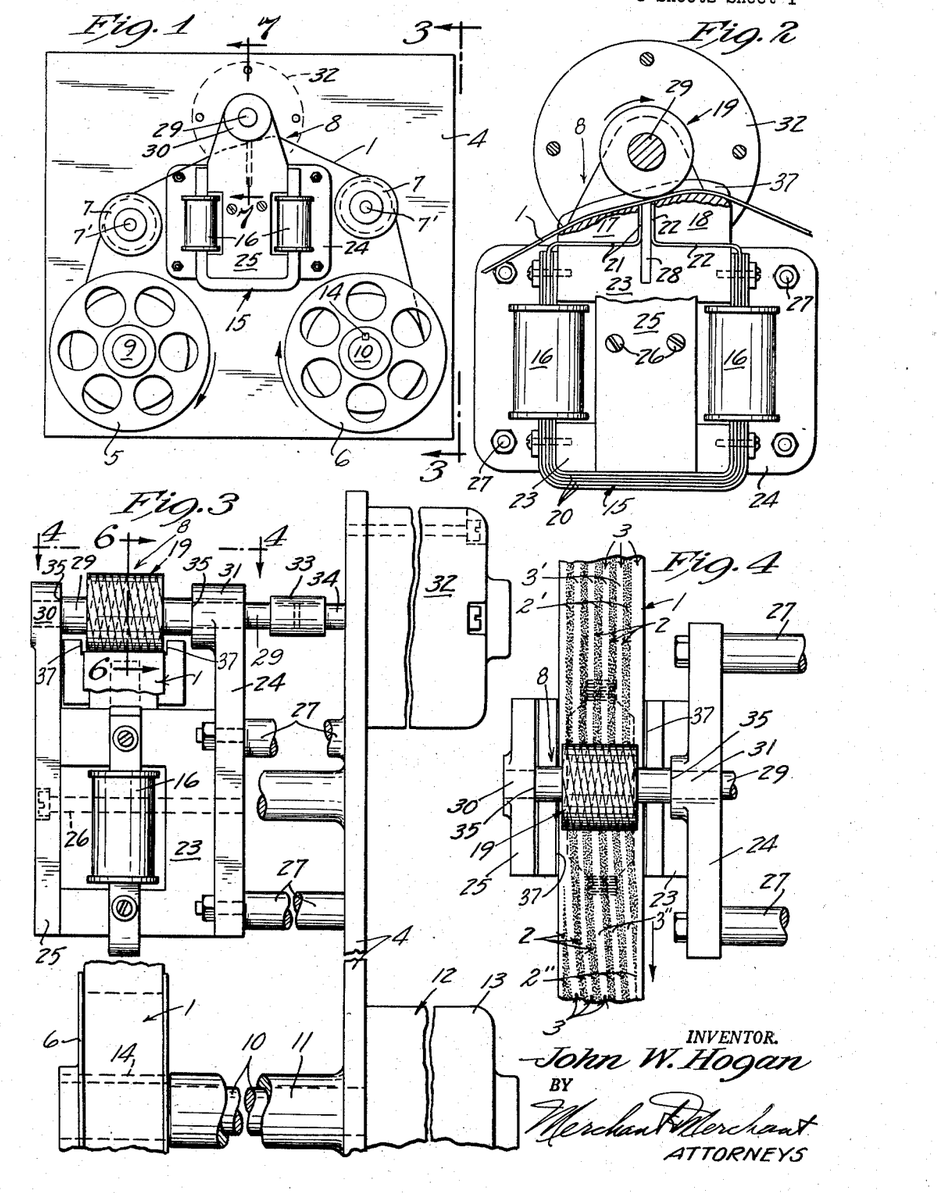
Fig. 1 is a view in side elevation of my apparatus for practicing the invention in connection with a magnetic record or storage member in the form of a tape and incorporating a preferred form of magnetic pickup or signal generator.
Fig. 2 is an enlarged detail view of the magnetic pickup or signal generator of Fig. 1 and showing the same in side elevation corresponding to Fig. 1, some parts being broken away.
Fig. 3 is an enlarged fragmentary detail view in end elevation, with some parts broken away, of the apparatus of Fig. 1, as seen from the line 3—3 of Fig. 1.
Fig. 4 is a correspondingly enlarged fragmentary top plan view, with some parts broken away, of the apparatus of Figs. 1 and 3, and as seen from the line 4—4 of Fig. 3.
Figure 5:
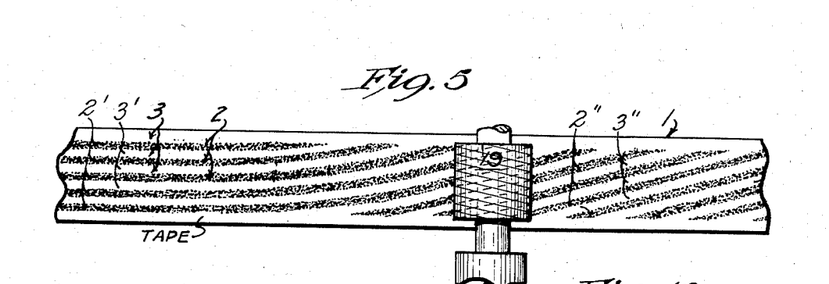
Fig. 5 is a fragmentary view corresponding to Fig. 4, but turned 90° in a clockwise direction with respect to Fig. 4 and showing a somewhat different rate of displacement of the magnetized tape traces than is shown in Fig. 4, and containing reference data not present on Fig. 4.

Some longitudinally extended sections of the traces 2 and 3 are parallel to, or have zero angulation with respect to, the edges and longitudinal axis of the tape; 1 whereas other longitudinally extended sections of the traces 2 and 3 are more or less angularly disposed with respect to the edges and longitudinal axis of the tape, as will be seen particularly by reference to Figs. 4 and 5; the direction and degree of such angulation varying throughout the different longitudinally extended sections or areas of the tape from zero angulation or parallelism. In machine control practice, trace sections 2 and 3, which are parallel to or have zero angulation with respect to the edges and longitudinal axis of the tape 1 will represent zero movement between tool and work. Sections of traces 2 and 3, which are laterally angularly disposed to the longitudinal axis and edges of the tape in one direction will represent tool-to-work or work-to-tool movement in one direction, lateral angulation of the sections of traces 2 and 3 in the other direction will represent an opposite direction of tool-to-work or work-to-tool movement, and the degree of angulation of the traces 2 and 3 with respect to the longitudinal axis of the edges of the tape will represent the rate of tool-to-work or work-to-tool movement, providing other factors remain constant.

Description of Figs. 1 through 7

The apparatus of Figs. 1 through 7 comprises a supporting structure in the nature of a vertically disposed plate 4, an idle tape spool 5, a driven tape spool 6, a pair of tape guiding idler wheels 7, and a preferred form of magnetic pickup or signal generating devices 8 made in accordance with the invention. The tape spools 5 and 6 are similar to the conventional film spools of motion picture projectors. The idler tape spool 5 is freely journalled on a stub shaft 9 rigid with and projecting from the mounting plate 4. The driven tape spool 6 is mounted on a driven shaft 10 that is journalled in the suitable bearing 11 rigid with the mounting plate 4 and is driven by a suitable electric motor or the like 12, shown as mounted on the plate 4. In most cases, the shaft 10 will be driven from the motor 12 through suitable reduction gearing, not shown, but which may be assumed to be contained within the housing 13 of the motor 12. In fact, in many instances, it will be desirable to utilize variable speed drive for the tape spool 6 in order to selectively control the speed of operation of a machine tool, or the like, subject to control of the apparatus described, but which machine tool has not been shown since it is not necessary to an understanding of the instant invention. Driving engagement between the shaft 10 and the tape spool 6 is shown as being effected by a key or spline 14, shown best in Fig. 1. It will, of course, be understood that the tape spools 5 and 6 are axially removable from their respective shafts 9 and 10 in the manner of film spools of moving picture projectors, for example. It will also be understood that the idle guide wheels 7 are of the flanged variety common to the moving picture art. Plate 4 is preferably of aluminum or other non-magnetic metal. Idle wheels 7 are journalled on stub shafts 7'.

The magnetic pickup or signal generating device 8 of Figs. 1 through 7 comprises a magnetic flux conductor 15, a pair of induction devices in the form of coils 16, a pair of dissimilar bronze tape guiding saddle blocks 17 and 18, and a rotary shunting device 19. The tape spool 5 is the initially loaded tape delivery spool, and the driven tape spool 6 is the taped receiving spool.

The tape 1 having suitable control indicia magnetically impressed thereon is threaded from the spool 5 over the adjacent idle roller 7, over the saddle blocks 17 and 18, and over the other idle roller 7 and is anchored to the driven receiving spool 6 so that the tape 1 will be progressed from left to right under clockwise driving movements of the receiving tape spool 6 with respect to Figs. 1 and 2. By reference to Figs. 1 and 2, it will be noted that the saddle blocks 17 and 18, which are somewhat wider than the tape 1, guide the tape 1 over the flux conductors 15 and induction devices 16 and under the rotary shunt 19.

The flux conductor 15 provides the working magnetic circuit and comprises a plurality of U-shaped laminations 20 and a pair of tape bars or magnetic circuit extenders 21 and 22 extending from the opposite legs of the U-shaped flux conductor 15 and respectively underlying the saddle blocks 17 and 18 and extending upwardly along a vertical surface thereof within the space between the saddle blocks 17 and 18 to spaced points adjacent the underside of the tape 1 and rotary shunt 19. As shown, the U-shaped flux conductor 15, the laminations 20 of which are preferably of .015 inch Mumetal or Permalloy, which have been hydrogen annealed, is formed around and mounted on a form block 23 of suitable non-magnetic material and which is secured to and between opposed plates 24 and 25 by screws or the like 26 (see particularly Figs. 2 and 3). The inner plate 24 is spaced from the main mounting plate 4 and is secured thereto by nut-equipped studs 27 integrally formed with the plate 4. The saddle blocks 17 and 18 are separated from the mounting block 23 by the tape bars or extenders 21 and 22, but are rigidly connected to the mounting block 23 by suitable means, not shown. In order to maintain spacing and positioning of the upwardly directed ends of the tape bars or extenders 21 and 22, a separator 28 carried by the mounting block 23 is snugly positioned between the said upwardly directed ends of the tape bars or extenders 21 and 22, as shown best in Figs. 2 and 6; this separator 28 being also formed of suitable non-magnetic material and having its upper end flush with the upper surfaces of saddle blocks 17 and 18.

The surfaces of saddle blocks 17 and 18 which contact the tape 1 are preferably highly polished and chromium plated to reduce friction to a minimum.

The induction devices 16 take the form of conventional induction coils and are wound about opposite legs of the laminated U-shaped flux conductor 15 so as to be inductively associated therewith and the flux circuit defined thereby. In practice, the induction coils 16 will preferably be connected in series to provide maximum output signal voltage.

Figs. 1–7 illustrate one species of magnetic shunt 19 that may be advantageously employed in the practice of the instant invention. This magnetic shunt 19 comprises a generally cylindrical body of metal having suitably high permeability to low flux densities; commercially available "Mumetal" and "Permalloy" having been found highly satisfactory for the purpose. Also, it is important that the laminations 20 of the flux conductor 15 and the tape bars or flux circuit extenders 21 and 22 be of metal having very high permeability to low flux densities, and it is found that these requirements can be very satisfactorily met by making the laminations 20 and elements 21 and 22 of commercially-available "Mumetal" or "Permalloy."

The rotary shunt 19 is concentrically mounted on a drive shaft 29 journalled in bearings 30 and 31 of plates 25 and 24, respectively (see Fig. 3). The axis of the rotary shunt 19 and shaft 29 extend transversely of the longitudinal axis and direction of movement of the tape 1 and parallel to upper and lower surfaces of the tape 1 in a direction transversely of the tape. The rotary shunt 19 is mounted fast on the shaft 29 and the shaft 29 is operatively coupled to a motor 32 through a coupling 33 and motor driven shaft 34. For the purpose hereof, it is important that the rotary shunt 19 be positively retained against axial movements. To this end, I have shown the shaft 29 as having shoulders 35 snugly seated against the ends of bearings 30 and 31. The shaft 29 is preferably of non-magnetic stainless steel.

For the herein-contemplated purpose, it is important that the rotary shunt 19 is driven at a constant predetermined speed. Hence, the motor 32 will preferably be of the 2-pole synchronous variety. For the purpose of the present example, it may be assumed that this 2-pole synchronous motor is energized with 60 cycle alternating current from any convenient source causing the rotary shunt to revolve continuously at a rate of three thousand six hundred revolutions per minute (3,600 r.p.m.) or sixty revolutions per second (60 r.p.s.).

Although the dimensions of the rotary shunt 19 are widely variable, said shunt may, for the purpose of the present example, be assumed to have a diameter of one-half of one inch (.500). It is, however, appreciated that the drawings are not to this scale. This rotary shunt 19 of Figs. 1 through 7 is exteriorly threaded, as shown best in Figs. 3 and 4 and 7. This threaded rotary shunt 19 actually takes the form of a screw. For the purpose of the present example, double spiral or helical threads 36 are formed on the outer surface of the rotary shunt, and preferably the interstices or spaces between the adjacent convolutions of the threads are filled with a plastic material 37 (see particularly Fig. 7) to provide a smooth cylindrical outer surface, which greatly reduces the exposed surface area to which foreign metallic particles may adhere. It will be understood that the only objective in employing a double or multiple spiral thread, as distinguished from a single thread, is to increase the frequency with which the traces 2 and 3 are traversed per revolution of the rotary shunt. It is important that there be one thread convolution for each of the traces 2 and 3, and that the threads 36 have flat crests or outer peripheral surfaces of widths, as measured axially of the rotary shunt 19 and transversely of the tape 1, equal to the widths of the individual traces 2 and 3. For the purpose of the present example, the crests of the threads 36 may be assumed to be .050 inch. Since the threads 36, as illustrated, are double, the lead of each thread 36 is two times .050 inch, or one hundred thousandths of an inch (.100 in.). Also, in accordance with the present example, the depth of the threads 36 may be assumed to be .030 inch.

Under rotation of the rotary shunt 19, the traces 2 and 3 are alternately scanned or traversed by the crests of the spiral threads 36; the several traces 2 being simultaneously traversed or scanned and the several traces 3 being likewise simultaneously traversed or scanned, but in alternate relation to the scanning of traces 2. Hence, it will be apparent that, on the basis of the example specifications given above, each of the traces 2 and 3 will be transversely scanned or traversed by the crests of the spiral threads 36 twice per revolution of the rotary shunt 19 or seven thousand two hundred times per minute (one hundred twenty times per second). Since the spiral threads 36 traverse the traces 2 and 3 transversely of the longitudinal axis of the tape, it will be apparent that they function much as would the teeth of a toothed rack mounted for displacement on and moved on an axis normal to the longitudinal axis of the record tape 1 and much as the teeth of a spur gear rotated on an axis extending parallel to the tape axis. This will, in fact, be made particularly apparent by comparison of the structure, function and operation of the rotary shunt of Figs. 1–7 with the structure, function and operation of Figs. 8 through 11, employing the latter type of rotary shunt. From these facts and the further fact that an axial section through the rotary shunt 19 at any and all places about its circumference shows a series of spaced teeth, it will be seen that the threads 36 of the rotary shunt 19 effectively constitute a plurality of shunt elements of tooth-like formation spaced apart axially of the rotary shunt and transversely of the longitudinal axis of the tape 1. All this will, in fact, be apparent, particularly from an examination of Fig. 7 from which it is seen that at any instant the threads 36 of the rotary shunt 19 function as a plurality of spaced shunt elements.

The periphery of the rotary shunt works in closely spaced relation to the upper surface of the tape to provide a fixed gap F (see Fig. 6) therebetween and the tape. For maximum efficiency, a minimum working clearance or gap F is desirable and in practice it has been found that a gap F as little as .001 inch is often desirable and that a gap F of .003 inch or more is tolerable or even desirable under some conditions.

Figure 6:
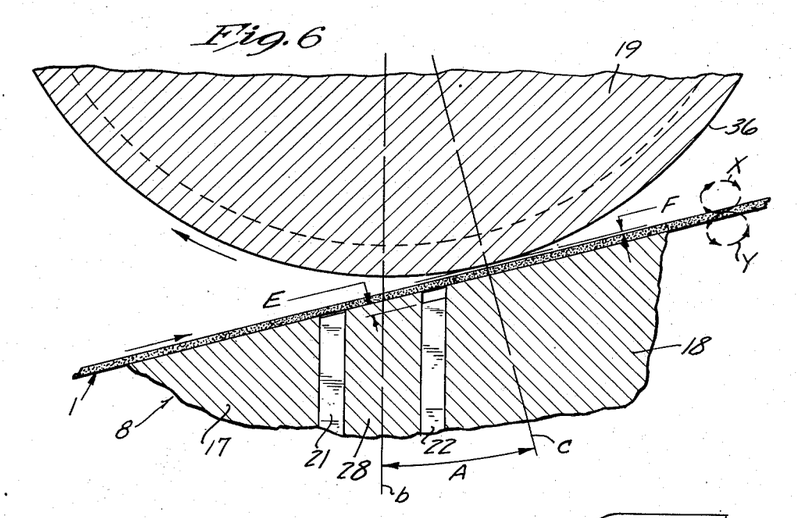
Fig. 6 is a greatly enlarged fragmentary detail sectional view, taken on the line 6—6 of Fig. 3.

The upper end of the tape bar or extender 21 (see particularly Fig. 6) is preferably flush with the upper surfaces of saddle blocks 17 and 18, separator 28 and the underside of the tape 1, whereas the upper end of the tape bar or extender 22 is spaced somewhat below the plane of the underside of the tape 1, to provide a gap E, as shown in Fig. 6, which may be .008 inch to .010 inch, for example. The tape bars or extenders 21 and 22 are spaced apart in the direction of the longitudinal axis of the tape to define spaced points or areas on the tape 1 from between which a primary flux circuit is established by the flux conductor comprising the U-shaped laminations 20 and said tape bars or extenders 21 and 22. This space or gap between the upper ends of the tape bars 21 and 22 is fixed by the separator 28, and for the purpose of the present example may be assumed to be on the order of .015 inch or .020 inch.

Preferably, and as shown, the rotary shunt 19 is threaded from end to end and is of an axial length approximately equal to the combined width of the several tape traces 2 and 3, and the tape bars 21 and 22 have a width exactly equal to an even number of traces.

In the preferred arrangement illustrated, the axis of the rotary shunt 19 is located in a vertical plane midway between the tape bars or circuit extenders 21 and 22. Also, in the preferred arrangement illustrated, the tape bearing upper surfaces of the saddle block 17, 18 and separator 28 are disposed at an inclination with respect to the horizontal, as shown most clearly in Figs. 2 and 6; this inclination being in the direction of tape advancement. As will be seen by reference to Fig. 6, this brings the closest point of tangency between the rotary shunt 19 and the upper surface of the tape considerably forward, with respect to the direction of advancement of the tape 1, of the vertical plane of the axis of the rotary shunt, and, in fact, forward of the tape bars or extender 22. Experience indicates that this non-symmetrical geometrical arrangement of elements shown is highly desirable for the purpose of maintaining the average flux transmitting ability of the rotary shunt equal or approximately equal to the flux conducting ability of the magnetic circuit underlying the tape 1 and defined by the flux conducting elements 15, 21 and 22. For the purpose of the instant example, it may be assumed that the inclination of the tape-supporting upper surfaces of the elements 17, 28 and 18 is approximately 15° with respect to the horizontal, so as to shift the point of tangency of the rotary shunt to the upper surface of the tape forwardly a like number of angular degrees with respect to a vertical plane intersecting the axis of the rotary shunt 19 and midway between the elements 21 and 22, as indicated by double arrow A of Fig. 6 and associated radius lines b, c.

For the purpose of the present example, it may be assumed that the threads 36 of the rotary shunt 19 have a depth of approximately .025 inch to .030 inch.

It should be appreciated that the above and other specifications given herein are merely cited as examples to aid others in understanding and practicing the instant invention and without any intention of restricting the scope of the protection apart from the language of the claims themselves.

*Operation, (Figs. 1–7)*

Figure 7:
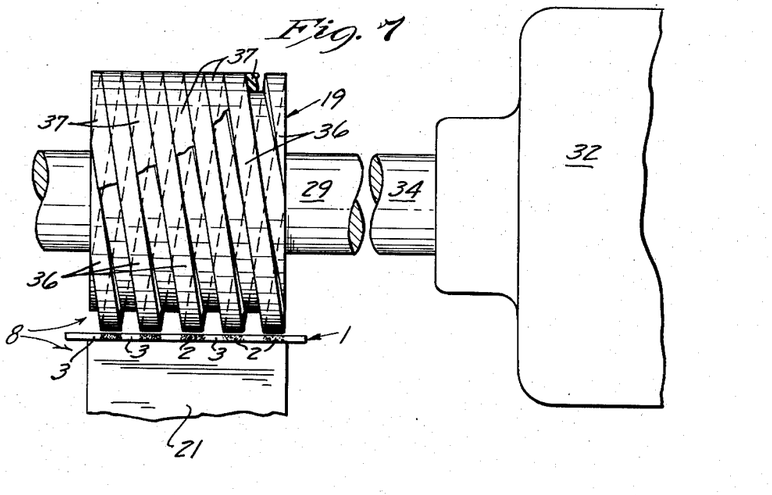
Fig. 7 is a detail sectional view taken on the line 7—7 of Fig. 1, with some parts on the section line shown in full, some parts omitted, and some parts broken away, showing the parts on a greatly enlarged scale with respect to Figs. 1 through 4, but on a greatly reduced scale with respect to Fig. 6.

When the tape 1 having a plurality of oppositely polarized traces 2 and 3 is operatively positioned over the upper ends of the flux circuit extenders 21 and 22, as shown in the drawings, a magnetic working flux circuit is established through sections of the traces 2 and 3 comprising and lying between longitudinally spaced points or areas thereof defined by the spaced upper ends of circuit extenders 21 and 22, which circuit additionally comprises the circuit extenders 21 and 22 and the U-shaped, laminated flux conductor or core structure 15. We then have a plurality of working flux circuits each comprising a longitudinal section of a trace 2 through which flux tends to flow in one direction and a corresponding number of working flux circuits each comprising a longitudinal extended section of a trace 3 through which flux tends to flow in the opposite direction. Since, in the present instance, we have equal numbers of flux circuits of opposite polarity defined by common flux conductors 15, 21 and 22, and since the flux energy of these opposite polarity circuits can be considered as equal, we will have, in the absence of some other influential factor or means, such as the rotary shunt 19, a condition of balanced opposing forces cancelling one another out and producing a condition of zero flux flow in the working flux circuit comprising the conductor 15. Obviously, under such zero flux flow condition in the circuit comprising conductor 15 or any steady state condition of flux flow in said circuit, there will be no electrical signal impulses induced in the induction coils 16, which, as previously stated, are preferably connected in series. Now if we consider the presence of the rotary shunt 19, particularly by reference to Figs. 6 and 7, it will be seen that the spiral threads 36 thereof continuously traverse the traces 2 and 3 of tape 1 in a direction transversely of the longitudinal axis of and edges of the tape record 1; the threads 36 being disposed alternately over the several traces 2 and 3. When the threads 36 of the rotary shunt 19 are disposed over the traces 2, as shown in Fig. 7, the said rotary shunt defines a series of flux shunt circuits each comprising a portion of a shunt thread 36 and the underlying longitudinally extended section of a trace 2 disposed between the spaced points or areas thereon defined by the spaced upper ends of extenders 21 and 22. On the other hand, when the shunt threads 36 are disposed immediately over the traces 3, a similar series of parallel flux shunt circuits will be set up or established each comprising a portion of a thread 36 and a longitudinally extended section of a trace 3 of the tape 1. It will be understood that the shunt threads 36 are substantially ineffective on the traces 3 when disposed in complete registration with the traces 2 and are substantially ineffective on the traces 2 when disposed in complete registration with the traces 3. Likewise, it should be apparent that when the shunt threads 36 are disposed in fifty percent registration with traces 2 and fifty percent registration with traces 3 that they will provide flux shunt circuits of reduced but approximately equal conductivity for the several traces 2 and 3. Since the shunt flux circuits above the tape and provided by the threads or teeth 36 of the rotary shunt 19 comprise the identical sections of the traces 2 and 3 forming parts of the working flux circuits below the tape, it will be apparent that such flux as is by-passed from the traces 2 and 3 is made unavailable to or effectively robbed from the corresponding working flux circuit below the tape. Hence, it will be seen that under rotation of the rotary shunt 19 causing repeated alternate traversal of the traces 2 and 3 by the shunt threads 36, the flux flow through the working flux circuits comprising traces 2 and 3 and conductor 15 will be intermittently and alternately reduced in magnitude, thereby causing flux flow impulses of alternating direction in the working flux circuit comprising conductor 15 and resultant A.C. electrical impulses in the induction coils 16. In other words, the flux flow to the working circuits below the tape 1 and comprising the traces 2 and conductor 15 will be at minimum magnitude when the shunt threads 36 are in complete registration with the traces 2 and will be at maximum when the shunt threads 36 are in complete registration with the traces 3; and the working shunt circuits below the tape 1 and comprising traces 3 and flux conductor 15 will be at minimum magnitude when the shunt threads 36 are in complete registration with traces 3 and will be at maximum when the shunt threads 36 are in complete registration with the traces 2; and the flux flow in the working flux circuits comprising traces 2 and 3 will be reduced substantially to zero by cancellation when the effective areas of the shunt threads 36 disposed above the upper ends of extenders 21 and 22 are midway between points of complete registration with the traces 2 and 3. Hence, if, as in accordance with the present example, the double threaded rotary shunt 19 be continuously rotated at the rate of 3,600 cycles per minute, we will, in the absence of lateral displacement of the traces 2 and 3 with respect to the longitudinal axis and edges of the tape 1, have established or set up a base frequency electrical signal at the outputs of the induction coils 16 of 7,200 cycles per minute.

In other words, this base signal frequency will be retained so long as the tape 1 remains stationary and will be retained under longitudinal advancement of the tape so long as the traces 2 and 3 thereof remain parallel to the longitudinal axis of direction and of movement of the tape 1. Of course, under most operating conditions, the tape 1 will be maintained in motion between the tape spools 5 and 6 by applying driving energy to the driven shaft 10 through the motor 12 or the like. Under these conditions, the base signal frequency will, as indicated, be retained so long as those portions of the traces 2 and 3 passing under the rotary shunt 19 and between the ends of extenders 21 and 22 remain parallel to the longitudinal axis or direction of movement of the tape because the traces 2 and 3 will, under such steady state conditions, traverse the traces 2 and 3 at a fixed predetermined rate. However, the electrical signal frequency will be varied or altered by lateral displacement of the traces 2 and 3, as they move between the ends of extenders 21 and 22 and under rotary shunt 19; the signal frequency being reduced with respect to base signal frequency under lateral or transverse displacement in the direction of traversal of the traces 2 and 3 by the shunt threads or teeth 36 and being increased with respect to base signal frequency under lateral or transverse displacement of the traces 2 and 3 in a direction opposite to the direction of traversal of the traces by the shunt threads 36. For the purpose of the present example, it may be assumed that the tape 1 is retained against bodily lateral or transverse displacement during its passage beneath the rotary shunt 19 by suitable guiding flanges 37, shown best in Figs. 2, 3 and 4, and that any and all lateral displacement of the traces with respect to the longitudinal axis and direction of movement of the tape will be the result of angular disposition of the currently operative longitudinal sections of the traces 2 and 3 with respect to the longitudinal axis and direction of movement of the tape. In Figs. 4 and 5, portions or sections of traces 2 and 3, which are parallel to the longitudinal axis and direction of movement of the tape 1 are indicated by 2' and 3' respectively and longitudinally extended sections of traces 2 and 3 which diverge laterally or are angularly disposed with respect to the longitudinal axis or direction of movement of the tape 1 are respectively indicated by 2" and 3". From a practical point of view, the only differences between Figs. 4 and 5 is the degree of divergence or angulation of some trace sections 2" and 3" with respect to the longitudinal axis and direction of movement of the tape.

Of course, it will be appreciated that for the purpose of machine control, the tape 1 or other record can be expected to be made up of some trace sections which are parallel or generally parallel to the longitudinal axis and direction of movement of the record tape and other longitudinal sections which diverge laterally from the longitudinal axis or direction of movement of the tape to different degrees and in different directions laterally of the tape axis and direction of movement thereof. In such machine control practice, the base frequency (7,200 cycles per minute c.p.m., according to the present example) produced by trace sections extending parallel to the longitudinal axis and direction of movement of the tape will generally represent zero tool-to-work or work-to-tool movement; signal frequencies below the base frequency and produced by trace sections 2 and 3 which diverge from the longitudinal axis and direction of movement of the tape in the direction in which the traces are scanned or traversed by the rotary shunt threads 36 will represent relative movement between the tool and work in one direction; and signal frequencies above the base frequency and produced by trace sections diverging laterally from the longitudinal axis and direction of movement of the tape in the other direction will represent relative movement between the tool and work in an opposite or other direction. Also, of course, it should be appreciated that the varying degrees of angulation or divergence of the traces in either direction vary the rate at which the traces 2 and 3 are traversed by the shunt threads or teeth 36 and produce corresponding variations in signal frequency which latter will generally represent different rates of feed between the tool and work. In actual practice, these frequency variations will generally be translated into signal phase changes, but such is not part of the instant invention.

Because, in the arrangement described, the traces 2 and 3 are polarized in opposite directions, an electrical signal of exceptionally high magnitude is produced. Furthermore, because, as previously indicated, the conductivity of each of the shunt flux circuits is, in the system described, equal to that of the associated working magnetic flux circuit, the electrical signal at the output of the induction coils 16 after conventional filtering, not shown, will be of true sine wave form.

*Description, Figs. 8–11*

The primary difference between the structure of Figs. 8–11 and the structure of Figs. 1–7 resides in the form of the rotary shunting device 19 of Figs. 1–7 as compared to the form of rotary shunting device 38 of Figs. 8–11. In this respect it will be noted that, while the device 19 of Figs. 1–7 is oriented with its axis disposed transversely of the storage tape or record 1 and has shunt elements in the form of spiral threads, the device 38 of Figs. 8–11 takes the form of a wheel disposed with its axis extending longitudinally of the record tape 1 and is provided with circumferentially spaced axially extended shunt elements in the form of teeth 39. The rotary shunting device 38 may be assumed to be of Permalloy or Mumetal and is shown as being mounted fast on a shaft 40 that is journalled in bearings 41, which bearings may be assumed to be mounted on the mounting plate 4 by means not shown. The shaft 40 and rotary shunt element 38 are driven from a suitable electric motor 42 through speed reducing gears 43 and 44, the former being fast on the motor shaft 45 and the latter being fast on shaft 40. The motor 42 is generally the equivalent of the motor 32 of Figs. 1–7 and may be assumed to be mounted on the mounting plate 4.

Figure 8:
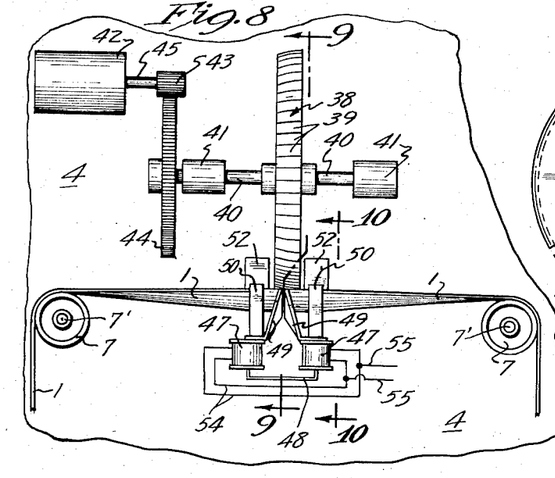
Fig. 8 is a fragmentary view, partly in side elevation and partly in diagram, corresponding in a general way to Fig. 1, but showing a somewhat modified form of magnetic pickup or signal generator.
Figure 9:
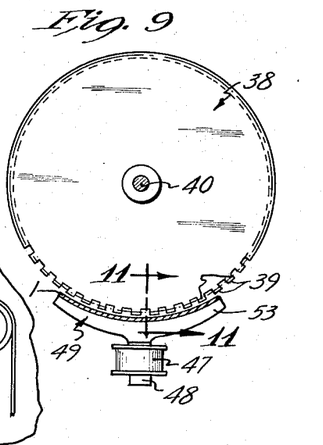
Fig. 9 is a transverse section taken substantially on the irregular line 9—9 of Fig. 8.
Figure 10:
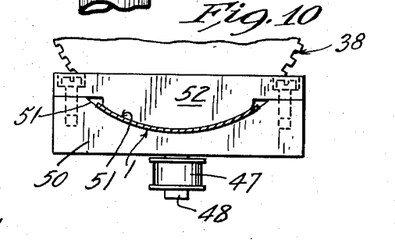
Fig. 10 is a fragmentary transverse section taken substantially on the line 10—10 of Fig. 8.
Figure 11:
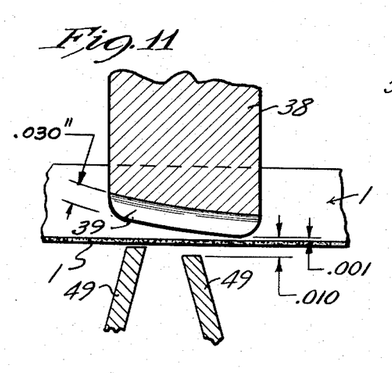
Fig. 11 is a greatly enlarged fragmentary detail end section taken substantially on the line 11—11 of Fig. 9.

The magnetic record tape or storage member 1 of Figs. 8 and 11 corresponds to that of Figs. 1–5 and therefore has corresponding magnetized traces 2 and 3. This magnetic storage member or tape 1 is mounted on the plate 4 substantially as shown in connection with Figs. 1–7 by means comprising spools 5 and 6, as shown in Figs. 1–7, but which were omitted in Figs. 8–11, and idle wheels 7 corresponding to those of Figs. 1–7. It will be understood that the record tape 1 will be advanced from left to right in respect to Fig. 8 by driving the tape spool 6 in the manner described in connection with Figs. 1–7.

A pair of induction devices in the form of coils 47 are mounted below the tape 1 and these correspond to the induction coils 16 of Figs. 1–7. These coils 47 are wound upon a flux conductor 48 coresponding generally to the flux conductor 15 of Figs. 1–7, but of somewhat different configuration; the flux conductor 48 being preferably of Permalloy or Mumetal and preferably but not essentially being laminated. The upper ends of the flux conductor 48 are extended to spaced points adjacent the tape by flux circuit extenders 49 corresponding generally to the circuit extenders 21 and 22 of Figs. 1–7. In order to cause the record tape 1 to conform generally to the arcuate contour of the rotary shunting device 38 as it passes thereunder, I provide a pair of saddle blocks 50 of suitable non-magnetic material and having concave arcuate tape seating upper surfaces 51 shown best in Figs. 9 and 10 and equipped at their upper ends with displaceably anchored forming blocks 52 (see Fig. 10). It will be seen that the forming blocks 52 have concave lower surfaces which follow the contour of, but are spaced from, the arcuate upper surface 51 of the saddle blocks 50 to receive the record tape 1 therebetween and cause the same to convex generally to the arcuate contour of and maintain the desired closely-spaced relationship with the rotary shunt element 38. The magnetic circuit extenders 49 have expanded head portions 53 with concave arcuate upper surfaces to conform to the arcuate shape of the record tape 1 as it passes between the saddle blocks 50; these heads 53 being located directly below the rotary shunt element 38 and being spaced apart longitudinally of the tape, much as are the corresponding circuit extenders 21 and 22 of Figs. 1–7, in a direction longitudinally of the tape and its traces 2 and 3.

The circuit extenders 49 are preferably of Permalloy or Mumetal and may be laminated if desired, but are shown as being of one piece construction.

In Fig. 8, the induction devices or coils 47 are shown as being connected in parallel, which may be desirable in some instances, although for most instances, where highest possible signal output voltage is desirable, a series hook-up of the coils 47 is preferred. The leads connecting the coils 47 in parallel are indicated by 54 and the output leads therefrom are indicated by 55. In the preferred construction of the device or apparatus of Figs. 8–11, the non-symmetrical arrangement shown best in Fig. 11 is employed for the purpose of maintaining the average flux transmitting ability of the rotary shunt element 38 equal or substantially equal to the flux conducting ability or capacity of the magnetic circuit underlying the tape 1 and defined by the flux conductor 48 and flux circuit extenders 49. Example specifications are shown on Fig. 11, but, of course, these may be varied without departing from the spirit or scope of the invention.

The spacing of the teeth 39 of the rotary shunt element 38 of Fig. 8–11 may, for the purpose of the instant example, be assumed to correspond to the spacing shown and described in connection with Figs. 1–7 and illustrated best at the bottom portion of Fig. 7; this spacing being, of course, determined primarily by the spacing between and widths of the magnetized traces 2 and 3 of the record tape 1.

The device of the apparatus of Figs. 8–11 functions substantially as does the apparatus of Figs. 1–7. Of course the base frequency will be determined by the speed of rotation of the shunt 38 and the number of teeth 39 thereon. For example, a base frequency of 400 c.p.s. will be obtained by providing 100 teeth 39 on the rotary shunt 38 and rotating the shunt 38 at the rate of 4 r.p.s.

What I claim is:

1. In a signal generating assembly for use with a magnetic storage member, a supporting structure, means for mounting such a magnetic storage member on the supporting structure, flux conducting means also mounted on the supporting structure and located on one side of the storage member and having spaced portions so located as to be in flux transmitting relationship with spaced points on the magnetic storage member to establish a primary flux circuit between said points on the storage member, an induction device mounted on the supporting structure in inductive relationship to the flux conducting means and the primary flux circuit established thereby to translate flux impulses in said primary flux circuit into electrical signal impulses, and a magnetic shunt element mounted on the other side of the storage member and guided on the supporting structure for movements into and out of magnetic flux shunting relationship with said primary flux circuit, and means moving said shunt element into and out of such shunting relationship to produce a flux impulse in the primary flux circuit and a corresponding electrical signal impulse in the induction element.

2. In a signal generating assembly for use with a magnetic storage member, a supporting structure, means for mounting such a magnetic storage member on the supporting structure, flux conducting means also mounted on the supporting structure on one side of the storage member and having spaced portions so located as to be in flux transmitting relationship with spaced points on the magnetic storage member to establish a primary flux circuit between said points on the storage member, an induction device mounted on the supporting structure in inductive relationship to the flux conducting means and the primary flux circuit established thereby to translate flux impulses in said primary flux circuit into electrical signal impulses, and a magnetic shunt element mounted on the other side of the storage member and guided on the supporting structure for movements into and out of magnetic flux shunting relationship with said primary flux circuit, and means moving said shunt element to bring the same repeatedly into and out of such shunting relationship, whereby to produce a series of flux impulses in primary magnetic flux circuit and corresponding series of electrical impulses in the induction element.

3. In a signal generating assembly for use with a magnetic storage member, a supporting structure, means for mounting such a magnetic storage member on the supporting structure, flux conducting means also mounted on the supporting structure on one side of the storage member and having spaced portions so located as to be in flux transmitting relationship with spaced points on the magnetic storage member to establish a primary flux circuit between said points on the storage member, an induction device mounted on the supporting structure in inductive relationship to the flux conducting means and the primary flux circuit established thereby to translate flux impulses in said primary flux circuit into electrical signal impulses, and a series of spaced magnetic shunt elements mounted on the supporting structure on the other side of the storage member for successive movements into and out of shunting relationship with the primary flux circuit, and means for so moving the shunt elements to produce a series of flux impulses in the primary flux circuit and a corresponding series of electrical signal impulses in the induction element.

4. An electrical signal generating assembly comprising a record having an elongated magnetic trace impressed thereon in parallel relation to a surface thereof, a magnetic pick-up circuit including a magnetic flux conductor located on one side of the record and having spaced portions disposed adjacent to points on the trace spaced longitudinally thereof to establish a magnetic flux circuit therethrough and the trace between said points, an induction element inductively associated with said magnetic flux circuit to translate flux impulses in said circuit into electrical output signal impulses, a magnetic flux shunt element located on the opposite side of the record and which when brought into shunting relationship with said trace points will establish a magnetic flux shunt circuit and produce resultant flux flow impulse in the first said flux circuit, and means providing relative movement between the shunt element and said trace to bring the shunt element periodically into and out of cooperative shunting relationship with said points on the trace to produce flux impulses in the first said flux circuit and resultant electrical signal impulses in the induction element.

5. An electrical signal generating assembly comprising a record having an elongated magnetic trace impressed thereon in parallel relation to a surface thereof, a magnetic pick-up circuit including a magnetic flux conductor located on one side of the record and having spaced portions disposed adjacent to points on the trace spaced longitudinally thereof to establish a magnetic flux circuit therethrough and the trace between said points, an induction element inductively associated with said magnetic flux circuit to translate flux impulses in said circuit into electrical output signal impulses, a plurality of spaced magnetic flux shunt elements located on the opposite side of the record and each of which when brought into shunting relationship with said trace points will establish a magnetic flux shunt circuit and resultant flux flow impulse in the first said flux circuit, and means providing relative movement between said shunt elements and said trace transversely of the trace to bring said shunt elements each successively into and out of cooperative shunting relationship with said points on the trace to produce a series of flux impulses in the first said flux circuit and resultant series of electrical signal impulses in the induction element.

6. In a signal generating assembly for use with a record having a magnetic trace extending longitudinally thereof, a supporting structure, means for mounting said record on the supporting structure and maintaining a predetermined relationship therebetween and the supporting structure, flux conducting means also mounted on the supporting structure and located on one side of the record and having spaced portions so located as to be in flux transmitting relationship with points on a record trace spaced longitudinally thereof to establish a primary magnetic flux circuit between said points on the trace, an induction device mounted on the supporting structure in inductive relationship to said flux conducting means and primary flux circuit to translate flux impulses in said primary flux circuit into electrical signal impulses, a magnetic shunt element mounted on the supporting structure at the other side of the record and guided on the supporting structure for movements into and out of magnetic flux shunting relationship with the said primary magnetic flux circuit, and means moving said shunt element to bring the same repeatedly into and out of such shunting relationship, whereby to produce a series of flux impulses in the primary magnetic flux circuit and a corresponding series of electrical signal impulses in the induction element.

7. A transducer for use with a magnetic storage member, said transducer comprising a supporting structure having means for mounting a magnetic storage member, flux conducting means mounted on the supporting structure at one side of the storage member and having spaced portions so located as to be in flux transmitting relationship with spaced points on the magnetic storage member to establish a primary flux circuit between said points on the storage member, an induction device mounted on the supporting structure in inductive relationship to the flux conducting means and the primary flux circuit established thereby, a magnetic shunt element mounted and guided on the supporting structure for movements into and out of the magnet flux shunting relationship with the primary flux circuit and located on the other side of the storage member, and means moving said shunt element into and out of such shunting relationship.

8. A transducer for use with a magnetic storage member, said transducer comprising a supporting structure having means for mounting a magnetic storage member, flux conducting means mounted on the supporting structure at one side of the storage member and having spaced portions so located as to be in flux transmitting relationship with spaced points on the magnetic storage member to establish a primary flux circuit between said points on the storage member, an induction device mounted on the supporting structure in inductive relationship to the flux conducting means and the primary flux circuit established thereby, a magnetic shunt element mounted and guided on the supporting structure for movements into and out of the magnet flux shunting relationship with the primary flux circuit and located on the other side of the storage member, and means repeatedly moving said shunt element into and out of such shunting relationship.

9. A transducer for use with a magnetic storage member, said transducer comprising a supporting structure having means for mounting a magnetic storage member, flux conducting means mounted on the supporting structure at one side of the storage member and having spaced portions so located as to be in flux transmitting relationship with spaced points on the magnetic storage member to establish a primary flux circuit between said points on the storage member, an induction device mounted on the supporting structure in inductive relationship to the flux conducting means and the primary flux circuit established thereby, a series of spaced magnetic shunt elements mounted on the supporting structure for successive movement into and out of shunting relationship with the primary flux circuit and located on the other side of the storage member, and means so moving the shunt elements.

10. A transducer for use with a magnetic storage member, said transducer comprising a supporting structure having means for mounting a magnetic storage member, means producing relative movement between the transducer and the magnetic storage member, flux conducting core structure mounted on the supporting structure and located at one side of the storage member, said flux conducting core structure comprising spaced portions defining a gap and being disposed in flux conducting relationship with spaced points on the magnetic storage member to establish a flux circuit comprising said core structure and the magnetic storage member, an induction device in inductive relationship to the core structure, and a flux flow modulator comprising a flux conducting body located on the other side of the magnetic storage member in generally opposed relation to the gap of said core structure and in flux conducting relationship with the same spaced points on the magnetic storage member.

11. A transducer for use with a magnetic storage member, said transducer comprising a supporting structure having means for mounting a magnetic storage member, means producing relative movement between the transducer and the magnetic storage member, flux conducting core structure mounted on the supporting structure and located at one side of the storage member, said flux conducting core structure comprising spaced portions defining a gap and being disposed in flux conducting relationship with spaced points on the magnetic storage member to establish a flux circuit comprising said core structure and the magnetic storage member, an induction device in inductive relationship to the core structure, and a flux flow modulator comprising a flux conducting body located on the other side of the magnetic storage member in generally opposed relation to the gap of said core structure and in flux conducting relationship with the same spaced points on the magnetic storage member, said body being characterized by being responsive to the influence of an external source of energy to provide a variable reluctance path to flux flow to and from the magnetic storage member, and an external energy source operatively associated with said body to periodically vary the reluctance thereof to such flux flow at a definite frequency.

12. A transducer for use with a magnetic storage member, said transducer comprising a supporting structure having means for mounting a magnetic storage member, means producing relative movement between the transducer and the magnetic storage member, flux conducting core structure mounted on the supporting structure and located at one side of the storage member, said flux conducting core structure comprising spaced portions defining a gap and being disposed in flux conducting relationship with spaced points on the magnetic storage member to establish a flux circuit comprising said core structure and the magnetic storage member, an induction device in inductive relationship to the core structure, and a flux flow modulator comprising a flux conducting body located on the other side of the magnetic storage member in generally opposed relation to the gap of said core structure and in flux conducting relationship to the same spaced points on the magnetic storage member, and means for moving said body to periodically vary the effective distance therebetween and the said spaced points on the magnetic storage member at a definite uniform rate, whereby to periodically vary the reluctance of the body to flux flow to and from the magnetic storage member at a definite frequency and thereby correspondingly vary the rate of flux flow through the flux conducting means on the opposite side of the storage member.

13. In combination with a magnetic storage member having opposed generally parallel sides and having an elongated magnetic trace impressed thereon in parallel relation to opposed sides thereof, an electrical signal generating assembly comprising a magnetic flux conducting core structure located at one side of the storage member and having spaced portions defining a gap disposed adjacent to spaced points on the storage member trace, an induction element inductively associated with the core structure to translate flux impulses in said circuit into electrical impulses, a magnetic flux modulator, said flux modulator comprising a flux conducting body located on another side of the magnetic storage member in generally opposed relation to the gap of the core structure and in flux conducting relationship with the same spaced points on the trace of the storage member, said body being responsive to the influence of an external source of energy to provide a variable reluctance path to flux flow to and from the magnetic storage member, an external source of energy operatively associated with said body to periodically vary the reluctance thereof to such flux flow at a definite frequency, and means producing relative movement between the storage member and the signal generating assembly.

14. A transducer for use with a magnetic storage member, said transducer comprising a supporting structure having means for mounting a magnetic storage member, a first flux conductor mounted on the supporting structure, said first flux conductor comprising spaced pole areas located in flux transmitting relationship with correspondingly spaced areas on the magnetic storage member and defining a magnetic path between said spaced areas of the magnetic storage member externally of the latter, a second flux conductor mounted on the supporting structure in spaced relation to the first flux conductor and the flux path defined thereby for movements through a field wherein it is in flux conducting relationship with the same said spaced areas on the magnetic storage member, and means for moving the second magnetic flux conductor progressively through said field.

15. A transducer for use with a magnetic storage member, said transducer comprising a supporting structure having means for mounting a magnetic storage member, a first flux conductor mounted on the supporting structure, said first flux conductor comprising spaced pole areas located in flux transmitting relationship with correspondingly spaced areas on the magnetic storage member and defining a magnetic path between said spaced areas of the magnetic storage member externally of the latter, a second flux conductor mounted on the supporting structure in spaced relation to the first flux conductor and the flux path defined thereby for movements through a field wherein it is in flux conducting relationship with the same said spaced areas on the magnetic storage member, and means for moving said second flux conductor progressively and repeatedly through said field at a desired frequency.

16. A transducer for use with a magnetic storage member, said transducer comprising a supporting structure having means for mounting a magnetic storage member, a first flux conductor mounted on the supporting structure, said first flux conductor comprising spaced pole areas located in flux transmitting relationship with correspondingly spaced areas on the magnetic storage member and defining a magnetic path between said spaced areas of the magnetic storage member externally of the latter, an induction device inductively associated with the said first flux conductor and flux path defined thereby, a second flux conductor mounted on the supporting structure in spaced relation to the first flux conductor and the flux path defined thereby for movements through a field wherein it is in flux conducting relationship with the same said spaced areas on the magnetic storage member, and means for moving the second magnetic flux conductor progressively through said field.

17. A transducer for use with a magnetic storage member, said transducer comprising a supporting structure having means for mounting a magnetic storage member, a first flux conductor mounted on the supporting structure, said first flux conductor comprising spaced pole areas located in flux transmitting relationship with correspondingly spaced areas on the magnetic storage member and defining a magnetic path between said spaced areas of the magnetic storage member externally of the latter, an induction device inductively associated with the said first flux conductor and flux path defined thereby, a second flux conductor mounted on the supporting structure in spaced relation to the first flux conductor and the flux path defined thereby for movements through a field wherein it is in flux conducting relationship with the same said spaced areas on the magnetic storage member, and means for moving said second flux conductor progressively and repeatedly through said field at a desired frequency.

18. A transducer for use with a relatively moving magnetic storage member having magnetic areas spaced transversely of the direction of its motion, comprising a flux conductor having spaced pole areas located in flux transmitting relationship with said respective spaced areas on the magnetic storage member and defining a magnetic path between said spaced areas of the magnetic storage member externally of the latter, and a flux flow modulator comprising a flux conducting member disposed in spaced relation to the first flux conductor and the flux path defined thereby and to be effectively arranged in flux conducting relationship with the same spaced areas on the magnetic storage member.

References Cited in the file of this patent

UNITED STATES PATENTS

| | | |
|---|---|---|
| 2,423,339 | Newman | July 1, 1947 |
| 2,628,539 | Neergaard | Feb. 17, 1953 |
| 2,641,656 | Dicke | June 9, 1953 |
| 2,726,287 | Sharp | Dec. 6, 1955 |